United States Patent [19]
Leidenfrost

[11] 3,817,533
[45] June 18, 1974

[54] EDUCATIONAL CARD GAME

[76] Inventor: Charles B. Leidenfrost, 3957 Warner Ave., Apt. A-2, Hyattsville, Md. 20784

[22] Filed: May 23, 1973

[21] Appl. No.: 362,221

[52] U.S. Cl......... 273/152.1, 273/137 D, 273/152.2, 35/72
[51] Int. Cl. ............................................. A63f 1/02
[58] Field of Search......... 273/152.2, 152.41, 152.5, 273/152.6, 137 C, 137 D, 152.1; 35/72

[56] References Cited
UNITED STATES PATENTS

| | | | |
|---|---|---|---|
| 1,123,622 | 1/1915 | Tercy | 273/152.41 |
| 1,292,184 | 1/1919 | Wells | 273/152.2 |

FOREIGN PATENTS OR APPLICATIONS

| | | | |
|---|---|---|---|
| 637,544 | 3/1962 | Canada | 273/137 D |
| 173,588 | 12/1921 | Great Britain | 273/137 D |

Primary Examiner—Anton O. Oechsle

[57] ABSTRACT

An educational game comprising a set of polygonal cards. The cards are each provided with a pictorial illustration on the front side and markings associated with each of the front side edges identifing a corresponding number of categories of relationships to the illustration. The reverse sides of the cards having markings along their edges corresponding to the markings along the front side edges and a printed summary which establishes a cognative relationship between the illustration and the categories defined by the markings.

1 Claim, 2 Drawing Figures

EDUCATIONAL CARD GAME

This invention relates to learning about some aspects of the arts, history, geography and the life sciences.

It is one objective of this invention to acquaint people with pictorial reproductions of works of art or pictorial illustrations of various facets of history, geography and the life sciences.

A further objective of this invention is to help individuals learn to verbalize on visual experiences and to teach how to establish cognate relationships between different categories of concepts and visual illustrations.

Referring now to the drawings.

Figure 1:
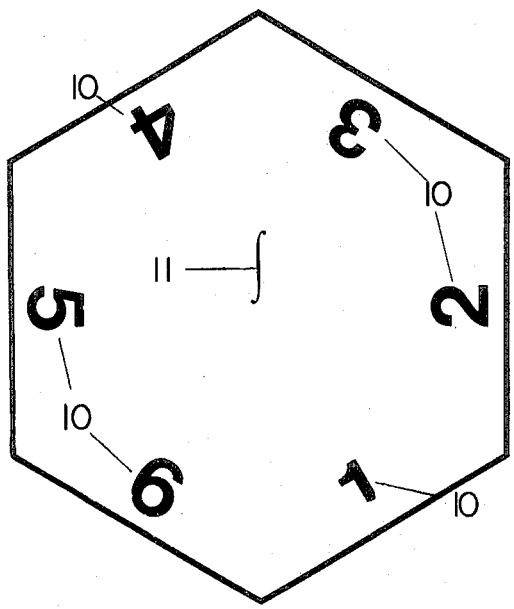
FIG. 1 illustrates the shape and the face side of one embodyment of my invention.

FIG. 1 illustrates a hexogonal card with a different number 10 identifying each side. These numbers stand for categories of information related to the illustration 11. If convenient, the full title of the category can appear instead of the number. The number of sides can vary from three to eight depending on the number of categories which are designed to relate to the illustration 11.

Figure 2:
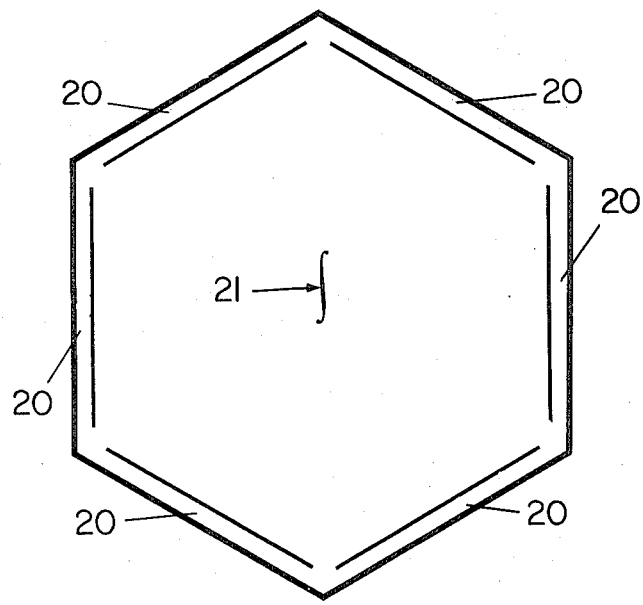
FIG. 2 illustrates the shape and the reverse side of one embodyment of my invention.

FIG. 2 illustrates the reverse side of the hexagonal card. Here a number and a name describing a different category appears on each side 20 and these must correspond to the numbers and/or names of categories on the face side of the cards. [FIG. 1. (10).] One set of categories might include, for instance: 1. Pictorial elements, 2. Pictorial qualities, 3. Style, tradition, 4. The artist, 5. Predecessors, 6. Followers.

The text 21 enclosed by the sides 20 includes the title of the illustration and key words, phrases or other brief information related to each category and relevant to the illustration on the face of the card.

The categories must be the same for all the cards within a set but the illustration will be different on every card. However different sets may have different categories of relationships. A deck or set includes a plurality of cards.

This is how the game is played: An equal number of cards is dealt to each player. The entire set may be distributed, but if it is not then the remainder is left to be drawn from each time a player has successfully deposited a card. All cards are handled in the deck or while dealing with the illustration (FIG. 1-11) up, or face up. As the cards are dealt they are displayed in front of each player face up.

The player next to the dealer selects one of his own cards and places it in the middle of the table or play area. At the same time he introduces it by its title which could be the name of a work of art and the name of the artist or an historic event or a geographic location etc. For a correct introduction the player is awarded two points and this is recorded on the score card.

The title is printed on the reverse side but that information can be obtained only under penalty of loss of points. When a player can not introduce any one of his cards, he must turn over the card of his choice and read out loud the complete title. For not knowing the title the player is penalized one point which is recorded on the score card. After the title has been identified, the card must be turned face up again and it now can be brought into play.

Whenever a new card is brought into play it must be introduced, however, the introduction may be challenged by any other player. In this case too, the card must be turned over for verification and the title must be read out loud. If the challenger was right, i.e., the introduction was incorrect, he receives three points and the introducer loses three points. But if the challenger was wrong. i.e., the introduction was correct, the challenger is penalized one point.

After either a successful or a penalized introduction the new card must be placed edge to edge with the card or one of the cards already put into play. One specific open and accessible edge must be chosen which represents one specific category. The choice must be declared by naming the category and repeating the title of the old card. Not knowing the title of a card already introduced may either make that card ineligible for attaching a new card or a penalty of one point must be paid for turning over any one of the old cards to obtain the title of it.

The player must then make a statement which connects the declared category of the old card with any category of the new one.

For an acceptable connecting statement a player gets two points. However, the accuracy of any connecting statement also can be challenged by any other player. For verification the card about to be brought into play must be turned over and the remarks, key words which are listed for the challenged category should be examined. If a clear answer can be found and the challenger is right he receives two points and the introducer forfeits the statement award and loses two more points. If the challenger is clearly wrong, i.e., the connecting statement was acceptable he loses one point. If the pending connecting statement can not be clearly verified the introducer must take back this card and keep it displayed. He also forfiets this turn. The next player introduces a new card.

If the connecting statement is accepted, the introducer places his card in the declared position edge to edge and takes a new card from the top of the remaining deck and displays it face up.

Now it is the next player's turn to introduce one of his cards.

The above procedure continues until all cards have been used up. The player with most points wins.

What is claimed is:

1. An educational game comprising a set of polygonal cards with each card of the set having the same number of edges, a different pictorial illustration on the front side of each card and the edges of each of the cards having markings to identify a number of categories of relationships to the illustration, each of the cards in the set having identical said markings along corresponding front side edges, the reverse sides of said cards having markings along the edges thereof corresponding to the markings along the front side edges and additionally a printed summary associated with each said marking which establishes a cognative relationship between the illustration and the category defined by said marking.

* * * * *